(No Model.)
J. ROHR.
WIRE STRETCHER.
No. 255,337. Patented Mar. 21, 1882.
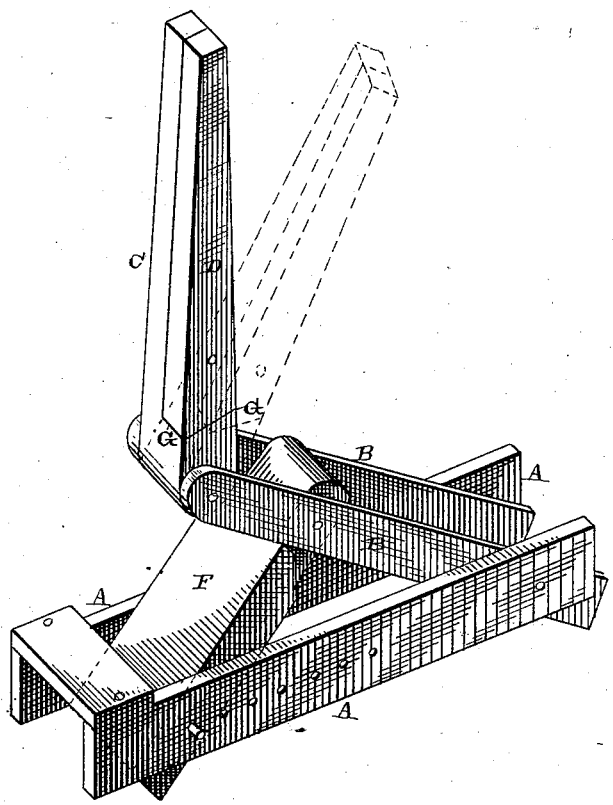
Witnesses:
J. B. Garner
W. S. D. Haines
Inventor:
Jos. Rohr,
per
F. A. Lehmann,
Atty.

UNITED STATES PATENT OFFICE.

JOSEPH ROHR, OF SWEDE POINT, IOWA.

WIRE-STRETCHER.

SPECIFICATION forming part of Letters Patent No. 255,337, dated March 21, 1882.

Application filed January 26, 1882. (No model.)

*To all whom it may concern:*

Be it known that I, JOSEPH ROHR, of Swede Point, in the county of Boone and State of Iowa, have invented certain new and useful Improvements in Machines for Stretching Wire; and I do hereby declare the following to be a full, clear, and exact description of the invention, such as will enable others skilled in the art to which it pertains to make and use it, reference being had to the accompanying drawing, which forms part of this specification.

My invention relates to an improvement in machines for stretching the wires of wire fences; and it consists in the combination of two levers which are pivoted together, one of which is shorter than the other, and has its inner end cut at an angle, so as to catch against the corresponding shoulder formed upon the longer lever, whereby the wire can be caught between the shorter lever and the shoulder on the longer one and stretched by turning the longer lever upon its pivot.

My invention further consists in a frame which rests upon the ground, the two supporting-bars, which are pivoted in this frame at one end, and an adjustable brace which supports the bars in position, and which brace is made adjustable at its lower end, so that the upper ends of the bars may be raised and lowered for the purpose of adjusting the lever to either the upper or lower wires of the fence, thus enabling it to exert a direct pull upon the wire, all of which will be more fully described hereinafter.

The object of my invention is to produce a cheap and simple machine, which can be used equally well upon high or low wires, and which can be made to tighten or stretch the wires with but very little exertion to the operator.

The accompanying drawing represents a perspective of my invention, showing the levers in one position in solid lines and in another position in dotted lines.

A represents a rectangular frame, which is intended to rest upon the ground, and which may be of any desired length or width. Pivoted in one end of this frame are the two bars B, which form a supporting-frame for the two levers C D. These two bars B are supported at any desired angle by means of the brace F, which is pivoted at its lower end inside of the frame A and at its upper end between the two bars B. In order to raise or lower the upper ends of the bars B, and thus adjust the height of the levers to either high or low wires, the lower end of the brace is made adjustable back and forth in the frame A by means of its adjustable pivot and a series of adjusting-holes. Of course the higher it is desired to adjust the upper end of the bars B the nearer the lower end of the brace is moved toward the lower end of the bars.

The longer lever C is pivoted between the upper ends of the two bars B, and has pivoted to its side a shorter lever, D. The pivot which unites these two levers together passes through the lever D near its inner end, and the inner end of this lever is cut upon an angle, as shown, so as to bear against the correspondingly-shaped shoulder G, which is formed upon the lever C. When it is desired to stretch the wires of a fence the brace is adjusted so as to raise or lower the upper ends of the bars B, and then the wire to be stretched is passed between the beveled end of the lever D and the shoulder G of the lever C, and the lever is raised to or slightly beyond a perpendicular position. The lever D then has its outer end moved forward until the whole length of the lever is in a line with the lever C, so as to cause its beveled end to catch tightly against the wire which is bearing upon the shoulder G, and the two levers, while the wire is thus clamped between them, are drawn backward toward the lower ends of the bars B.

It will readily be seen from the above construction that a very powerful pull can be exerted upon the wire with but very little exertion to the operator.

Having thus described my invention, I claim—

1. In a machine for stretching wire, the combination of the lever C, provided with the slanting shoulder G, the lever D, pivoted to the side of the lever C and provided with a beveled end, and the supporting-frame B, substantially as described.

2. The combination of the supporting-bars, the frame A, the levers C D, and the brace, the brace being made adjustable back and forth at its lower end for the purpose of raising and lowering the levers, substantially as set forth.

In testimony whereof I affix my signature in presence of two witnesses.

JOSEPH ROHR.

Witnesses:
J. W. MILLIGAN,
JOHN W. NEWBROUGH.